United States Patent
Sechman et al.

(10) Patent No.: US 10,515,219 B2
(45) Date of Patent: Dec. 24, 2019

(54) DETERMINING TERMS FOR SECURITY TEST

(71) Applicant: HEWLETT PACKARD ENTERPRISE DEVELOPMENT LP, Houston, TX (US)

(72) Inventors: Ronald J. Sechman, Alpharetta, GA (US); Prajakta Jagdale, Sunnyvale, CA (US); Sasi Muthurajan, Alpharetta, GA (US); Nidhi Kejriwal, Alpharetta, GA (US)

(73) Assignee: MICRO FOCUS LLC, Santa Clara, CA (US)

(*) Notice: Subject to any disclaimer, the term of this patent is extended or adjusted under 35 U.S.C. 154(b) by 330 days.

(21) Appl. No.: 15/327,174

(22) PCT Filed: Jul. 18, 2014

(86) PCT No.: PCT/US2014/047161
§ 371 (c)(1),
(2) Date: Jan. 18, 2017

(87) PCT Pub. No.: WO2016/010552
PCT Pub. Date: Jan. 21, 2016

(65) Prior Publication Data
US 2017/0200013 A1    Jul. 13, 2017

(51) Int. Cl.
*G06F 21/57* (2013.01)
*G06F 11/36* (2006.01)

(52) U.S. Cl.
CPC ........ *G06F 21/577* (2013.01); *G06F 11/3612* (2013.01); *G06F 11/3672* (2013.01); *G06F 2221/033* (2013.01)

(58) Field of Classification Search
CPC .. G06F 21/577; G06F 21/50; G06F 2221/033; G06F 11/3672; G06F 11/3612
See application file for complete search history.

(56) References Cited

U.S. PATENT DOCUMENTS

| | | |
|---|---|---|
| 7,451,149 B2 | 11/2008 | Lee et al. |
| 8,538,030 B1 | 9/2013 | Belenko et al. |
| 2004/0139331 A1 | 7/2004 | Sanai et al. |
| 2005/0154923 A1 | 7/2005 | Lok et al. |
| 2007/0186285 A1 | 8/2007 | Hurst et al. |

(Continued)

FOREIGN PATENT DOCUMENTS

| | | |
|---|---|---|
| EP | 1924050 A2 | 5/2008 |
| WO | WO-2014035386 | 3/2014 |
| WO | WO-2014051597 | 4/2014 |

OTHER PUBLICATIONS

International Search Report and Written Opinion, International Application No, PCT/US2014/047161, dated Feb. 24, 2015, pp. 1-10, KIPO.

(Continued)

*Primary Examiner* — Cheng-Feng Huang

(57) ABSTRACT

Example embodiments disclosed herein relate to determining terms for a security test. Terms associated with an application under test are determined. The terms are filtered with words in a dictionary to generate a filtered set or wordlist. The set or wordlist is used for input to the application under test for the security test.

16 Claims, 4 Drawing Sheets

(56) References Cited

U.S. PATENT DOCUMENTS

| | | | |
|---|---|---|---|
| 2007/0199050 A1* | 8/2007 | Meier | G06F 21/577 |
| | | | 726/4 |
| 2008/0120722 A1* | 5/2008 | Sima | H04L 63/1433 |
| | | | 726/25 |
| 2008/0256638 A1 | 10/2008 | Russ et al. | |
| 2010/0169974 A1 | 7/2010 | Calendino et al. | |
| 2011/0283110 A1* | 11/2011 | Dapkus | G06F 21/577 |
| | | | 713/182 |
| 2012/0240236 A1* | 9/2012 | Wyatt | G06F 21/564 |
| | | | 726/25 |
| 2013/0160131 A1* | 6/2013 | Madou | G06F 11/3688 |
| | | | 726/25 |
| 2013/0339930 A1* | 12/2013 | Xu | G06F 11/3684 |
| | | | 717/125 |
| 2014/0137228 A1* | 5/2014 | Shema | H04L 67/02 |
| | | | 726/11 |
| 2015/0347756 A1* | 12/2015 | Hidayat | G06F 21/57 |
| | | | 726/22 |

OTHER PUBLICATIONS

OWASP Foundation, "OWASP Testing Guide 2008 V3.0," Jan. 13, 2009, pp. 1-349.
SANS Institute, "SANS Institute InfoSec Reading Room—A Fuzzing Approach to Credentials Discovery using Burp Intruder," Feb. 11, 2009, pp. 1-49.
Sascha Zeisberger and Barry Irwin, "Building a Graphical Fuzzing Framework," Jul. 13, 2012, pp. 1-7, Rhodes University, Grahamstown, South Africa.
European Patent Office, Extended Search Report for 14897810.9-1218 I 3170115 PCT/US2014047161 dated Jan. 30, 2018 (8 pages).

* cited by examiner

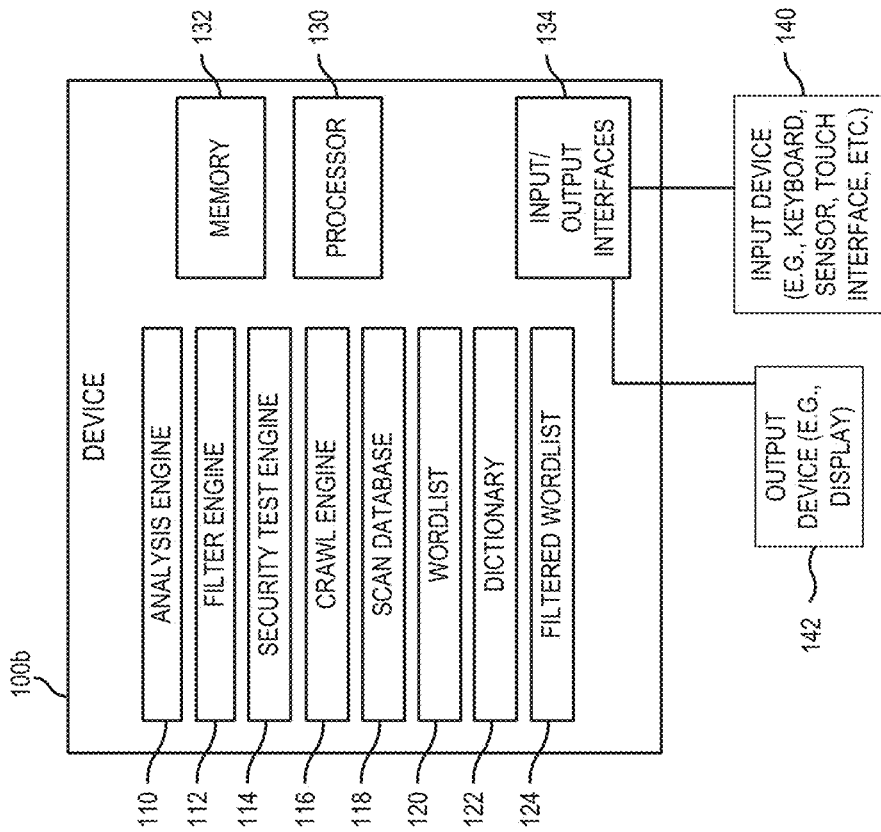

DETERMINING TERMS FOR SECURITY TEST

BACKGROUND

Software security testing is used to identify vulnerabilities in an application such as a Web application. Dynamic Analysis is the analysis of computer software performed on executing programs. Traditional black-box security testing for Web-based software works by using a security testing application, often referred to as a scanner, which poses as an attacker. In a black-box approach, the scanner explores an Application Under Test (AUT) by making Hypertext Transfer Protocol (HTTP) requests and evaluating the HTTP responses in order to find all of the URLs where the AUT accepts input. The URLs where the AUT accepts input may be referred to the attack surface of the AUT. The scanner then creates attacks based on the attack surface and likely categories of vulnerabilities. The scanner applies the attacks to diagnose the presence or absence of vulnerabilities by evaluating the program's HTTP responses.

BRIEF DESCRIPTION OF THE DRAWINGS

The following detailed description references the drawings, wherein:

FIGS. 1 and 2 are block diagrams of computing devices capable of generating terms for a security test, according to various examples;

DETAILED DESCRIPTION

Figure 3:
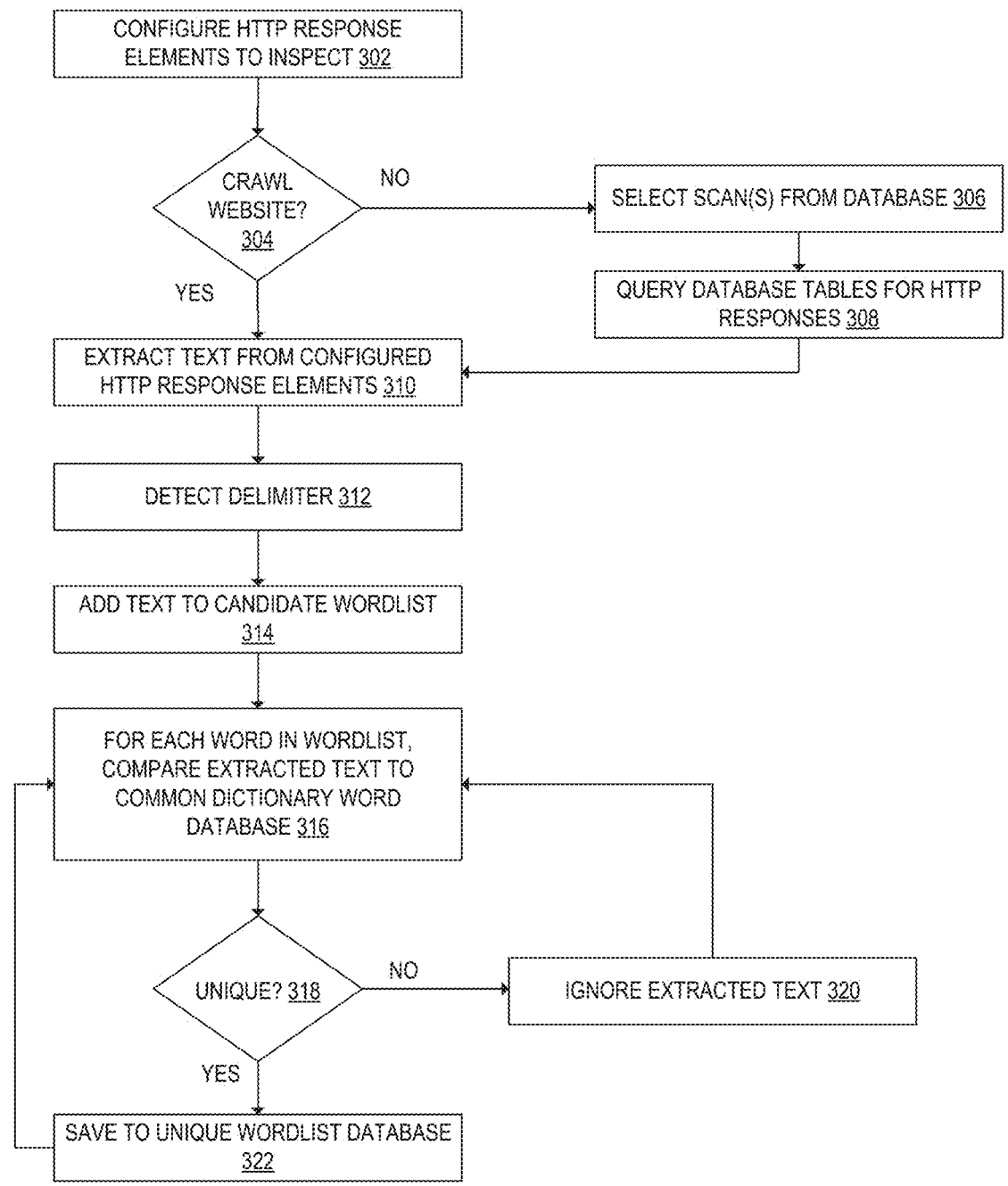
FIG. 3 is a flowchart of a method for generating terms for a security test, according to one example.

As noted, software security testing of applications can be performed to determine vulnerabilities in an application, such as a web application. Testing can be done to ensure that data used by the web application is protected from being overwritten and/or read, to ensure that the web application stays up, to protect against various attacks, to keep data safe, etc.

When a company desires to know how secure a web application the company has in production is or going to be put into production, the company often uses a security testing solution. The company may wish to use a copy of the application in production as an Application Under Test (AUT).

As noted, a security testing application, often referred to as a scanner, which poses as an attacker, can be used to test the AUT. In a dynamic approach, the scanner explores an AUT by making Hypertext Transfer Protocol (HTTP) requests and evaluating the HTTP responses in order to find all of the URLs where the AUT accepts input. The URLs where the AUT accepts input may be referred to the attack surface of the AUT. The scanner then creates attacks based on the attack surface and likely categories of vulnerabilities. The scanner applies the attacks to diagnose the presence or absence of vulnerabilities by evaluating the program's HTTP responses. Some of these attacks may include brute force attacks used to break authentication and/or authorization of the AUT.

Approaches described herein provide a means to passively analyze traffic between an automated web application scanner or proxy tool and the target web application with the intent of identifying unique terminology that may serve as authentication and/or authorization tokens within the target application. This provides a tailored word list that can be used internally by an automated web application scanner or externally using 3rd party fuzzing tools to brute force protected access to an application.

Brute force, implies a time-consuming exercise of trying all known combinations against a central target with the hope of identifying the correct combination of credentials. Therefore, as an attacker, the amount of time required to identify the correct combination of credentials is in direct conflict with the defender trying to identify your malicious behavior. As a security professional, who often mimic known attacker techniques to comprehensively test security controls, this same limitation applies.

As such, a problem encountered with brute force attack campaigns is that the campaigns can be time consuming and rely on dictionary wordlists that don't account for semantic language unique to the target web application. This means that effectively, the correct set of authentication credentials may not be found. Often times, the proper vernacular already exists within the target web application, albeit hidden or not readily apparent to the security tester.

The embodiments described herein provide a method to passively identify and collect terms unique to each target web application and produce a word list to be used by a fuzzing tool or other security test for an effective brute force campaign. One of the issues that the solutions help to solve is to decrease the amount of guesswork required to perform a brute force campaign and compile a list of known words sourced from the target site itself and use that as the starting point for your brute force campaign. The end result is a higher probability of finding the right combination of unique words that may never be present in a traditional dictionary-based attack since the token is sourced from a unique target site.

As noted, the word list can be used as a base for the attack. Attacks can be prioritized based on the word list. Further, filter mutations can be used to augment the word list to create phrases/words to be used in the attack (e.g., 1337-speak filter to change one or more 'o' to '0' and 'e' to '3' throughout the target wordlist, ROT13 filter, etc.).

While attacks are being performed the security test can monitor information being sent and/or received from the AUT. As such, vulnerabilities can be detected. Further, the vulnerabilities can include information that the security test can access that may be under the protection of an authorization and/or authentication mechanism.

A user interface can enable certain selections of HTTP Response elements to inspect (e.g. HTML tags, javascript, etc.) that would be applied either to a stored file of recorded web traffic or applied inline within a proxy session. If used within a security test engine (e.g., a scanner), a scan or set of scans could be selected to run the analysis offline.

The extracted elements can be inspected for delimiters. This can include, but is not limited to, whitespace. The textual elements can be added to a candidate wordlist (e.g., in the form of an array or other data structure). For each word contained in the candidate data structure, comparisons would be made against known dictionary words and words already encountered during the session to filter out distinctive words that appear on the target site (e.g., are not in the dictionary, are used more often or in certain ways in the target site, etc.).

Once the analysis of the static scan database is complete or the inline proxy session has transpired, the result is a list of terms that are present on the target site(s) examined that can be used for further testing within a fuzzer or other security test engine. As noted, these terms can be used as a base for the testing and may be modified with other terms during the testing.

In some examples, the security test can be implemented via a scanner. A web application vulnerability scanner is an approach for identifying vulnerabilities in a web application. A scanner starts by crawling the AUT to identify the attack surface. In black-box testing, the tester is unaware of the internal workings of the AUT. In grey-box testing, the tester knows at least a part of the internal workings of the AUT. A runtime agent or observer can be installed on the application server to assist with identifying the attack surface more accurately. The scanner can find vulnerabilities and produce vulnerability reports. The vulnerability reports can include vulnerabilities found using, at least partially, a brute force attack or other fuzzing approach using a set of terms that may be considered unique to the AUT. This may be due to finding additional attack surface and/or leakage of information that should be protected.

FIGS. 1 and 2 are block diagrams of computing devices capable of generating terms for a security test, according to various examples. Devices 100*a*, 100*b* include components that can be utilized to determine a set of words that can be used as input to an AUT during a security test. The respective devices 100*a*, 100*b* may be a notebook computer, a desktop computer, a server, a workstation, or any other computing device that is capable of performing the functionality described herein.

The engines 110, 112, 114, 116 include hardware and/or combinations of hardware and programming to perform functions provided herein. Moreover, the modules (not shown) can include programming functions and/or combinations of programming functions to be executed by hardware as provided herein. When discussing the engines and modules, it is noted that functionality attributed to an engine can also be attributed to the corresponding module and vice versa. Moreover, functionality attributed to a particular module and/or engine may also be implemented using another module and/or engine.

Analysis engine 110 can be used to analyze traffic between a web application scanner and an AUT to generate terms for a wordlist 120 for a security test. The traffic can be based on a scan database 118 generated by one or more previous scans of the AUT and/or based on an active security test performed by a security test engine 114. The scan database 118 can be based on a crawl of the AUT by the crawl engine 116. The scan database 118 can be one or more data structures describing the AUT.

The crawl engine 116 can visit Uniform Resource Locators (URLs) of the AUT and traverse the pages found. The information received (e.g., web pages) from the AUT can be processed. For example, in the case of characters and/or strings of characters, delimiters can be used to determine one or more words or terms. In certain examples, a delimiter is a sequence of one or more characters that can be used to specify a boundary between separate, independent regions of text or other data streams. For example, delimiters may include white space, punctuation (e.g., a comma, a semicolon, exclamation mark etc.), special characters (e.g., a star, a bracket, operators, quotations, etc.), or the like. In certain examples, analysis can be performed using multiple different searches for delimiters so that special words may be found including certain types of special characters (e.g., it may be beneficial to keep numbers with letters to generate some words, but not in others). Processing can also be based on a database created during the security test.

A filter engine 112 can be used to filter terms of the wordlist 120 based on a dictionary 122 database to generate a filtered wordlist 124. The filtering can be to filter out terms in the wordlist 120 that are not unique compared to the dictionary 122. In certain examples, the dictionary 122 is a common word dictionary. In certain examples, a common word dictionary can include a list of words that may be considered frequently used. Further, in certain examples, the common word dictionary can include a list of words that are in common with two or more published dictionaries. The filtered wordlist 124 can be considered a wordlist that includes terms that are used on the website that may not be used in other locations. In some examples, the terms may include character strings that include numbers within the characters and/or other characters or symbols.

In some examples, the filter engine 112 is to further generate respective hashes of the terms of the wordlist 120. Hashes can be determined for the dictionary 122 as well. The hashes can be compared to more quickly identify whether the words in the wordlist 120 are also in the dictionary during the filtering process. Hashes for the dictionary 122 can be pre-computed. The variable content from wordlist 120 generated from the AUT will can be compared to the pre-computed hash list in order for a more expedient search/comparison. The hashing can be implemented using similar approaches as rainbow tables.

The filtered wordlist 124 can be used by the security test engine 114 for input to the AUT during the security test. In one example, the terms can be prioritized in conjunction with the dictionary 122 for generating one or more tokens to be used in fuzzing. The tokens can be used in a brute force attack. The attack can be on input fields such as authentication and/or authorization fields. In some examples, the fields can include a user name/identifier field (e.g., email, a user identifier, etc.) and/or a password field.

In one example, the security test engine 114 can generate a token based on at least one of the terms. In addition, the token can further be based on other information, such as the dictionary, one or more algorithms to modify the terms of the filtered wordlist 124, etc. Modifying the words from the filtered wordlists may include one or more filters/algorithms (e.g., 1337-speak filter to change one or more 'o' to '0' and 'e' to '3' throughout the target wordlist, ROT13 filter, etc.). As noted, the tokens can be used to do perform an attack on the AUT, such as a brute force attack, or other fuzzing campaign. As such, the filtered wordlist 124 can be used as a base for the attack.

In some examples, the tokenization process can be started at the analysis of the traffic of the AUT. Initial tokens can be generated as part of the wordlist 120. The filtering and further generation of the tokens used for the attack can be due to additional processing of the filtered wordlist 124. Moreover, the tokens generated from the filtered wordlist 124 can be prioritized as compared to other words in the dictionary 122 during the attack because these tokens may include words with contextual value for the AUT.

A processor 130, such as a central processing unit (CPU) or a microprocessor suitable for retrieval and execution of instructions and/or electronic circuits can be configured to perform the functionality of any of the engines 110, 112, 114, 116, or modules (not shown) described herein. In certain scenarios, instructions and/or other information, such as a scan database 118, wordlist 120, dictionary 122, filtered wordlist 124, etc., can be included in memory 132 or other memory.

In some examples, input/output interfaces 134 may additionally be provided by the device 100b. For example, input devices 140, such as a keyboard, a sensor, a touch interface, a mouse, a microphone, etc. can be utilized to receive input from an environment surrounding the device 100b. Further, an output device 142, such as a display, can be utilized to present information to users. Examples of output devices include speakers, display devices, amplifiers, etc. Moreover, in certain embodiments, some components can be utilized to implement functionality of other components described herein. Input/output devices such as communication devices like network communication devices or wireless devices can also be considered devices capable of using the input/output interfaces 134.

Each of the modules may include, for example, hardware devices including electronic circuitry for implementing the functionality described herein. In addition or as an alternative, each module may be implemented as a series of instructions encoded on a machine-readable storage medium of computing device and executable by processor. It should be noted that, in some embodiments, some modules are implemented as hardware devices, while other modules are implemented as executable instructions.

The AUT may be encoded in any suitable Web-based computer language, such as JAVA, or .NET, among others. The AUT may operate within a suitable software framework, such as Struts, Struts 2, ASP.NET MVC, Oracle WebLogic, and Spring MVC, or the like. The software framework includes a set of common code modules that provide generic functionality, which can be selectively overridden or specialized by user code to providing specific functionality. The AUT may be configured to execute one or more instances of a Java Virtual Machine (JVM), Common Language Runtime (CLR), other runtime environment for processing requests from the security test engine (e.g., scanner).

FIG. 3 is a flowchart of a method for generating terms for a security test, according to one example. Although execution of method 300 is described below with reference to device 100, other suitable components for execution of method 300 can be utilized (e.g., computing device 500). Additionally, the components for executing the method 300 may be spread among multiple devices. Method 300 may be implemented in the form of executable instructions stored on a machine-readable storage medium, such as storage medium 520, and/or in the form of electronic circuitry.

At 302, the computing device 500 can configure Hypertext Transfer Protocol (HTTP) response elements to inspect. In one example, a selection of response elements can be made from a list (e.g., HyperText Markup Language (HTML) tags, javascript, etc.). The response elements can also be customized to look for particular information or information types transferred. This can be applied to a file storing recorded web traffic with the AUT and/or applied inline with a proxy session.

In the case that a website is not crawled at 304, one or more scans including the web traffic can be selected from a database at 306. Database tables of the database can be queried for HTTP responses at 308. In the case that the website is crawled during the process or not crawled, at 310, text can be extracted from configured HTTP response elements. The text can be separated by detecting delimiters at 312. As noted above, delimiters used can be customized. The separated text can be added to a candidate wordlist at 314. The candidate wordlist can be stored in a data structure (e.g., an array, a table, etc.).

At 316, for each word in the wordlist, the extracted text can be compared to a common dictionary word database. At 318, it is determined whether the word is unique compared to the common dictionary word database. If the word is not unique, the extracted text in the word is ignored at 320 and the next word can be compared. If the word is unique compared to the wordlist, then, at 322, the word can be saved in a unique wordlist database. This process can go on for each word in the wordlist. As noted above, the comparison can be implemented using hashes.

Figure 4:
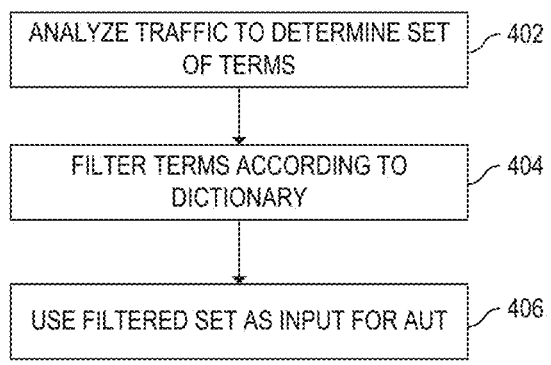
FIG. 4 is a flowchart of a method for using a filtered set of terms as input to an application under test, according to one example.
Figure 5:
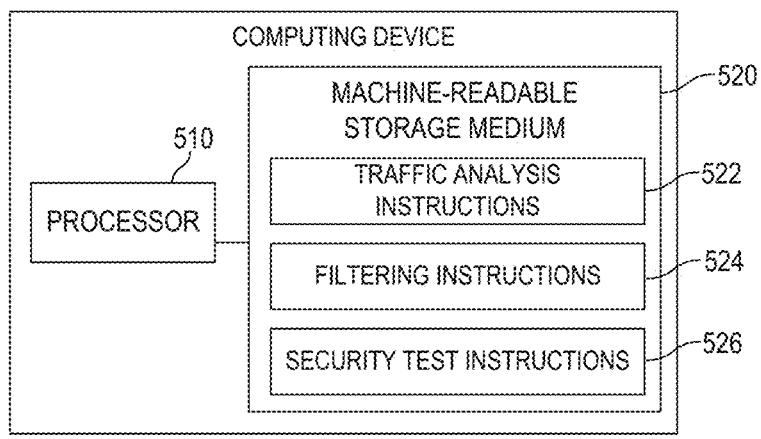
FIG. 5 is a block diagram of a computing device capable of using a filtered set of terms as input to an application under test, according to one example.

FIG. 4 is a flowchart of a method for using a filtered set of terms as input to an application under test, according to one example. FIG. 5 is a block diagram of a computing device capable of using a filtered set of terms as input to an application under test, according to one example. Although execution of method 400 is described below with reference to computing device 500, other suitable components for execution of method 400 can be utilized (e.g., device 100). Additionally, the components for executing the method 400 may be spread among multiple devices. Method 400 may be implemented in the form of executable instructions stored on a machine-readable storage medium, such as storage medium 520, and/or in the form of electronic circuitry.

Computing device 500 includes, for example, a processor 510, and a machine-readable storage medium 520 including instructions 522, 524, 526 for determining and/or using a filtered set of terms as input to an AUT. Computing device 500 may be, for example, a notebook computer, a slate computing device, a mobile phone, a workstation, a desktop computer, or any other computing device capable of performing the functionality described herein.

Processor 510 may be, at least one central processing unit (CPU), at least one semiconductor-based microprocessor, at least one graphics processing unit (GPU), other hardware devices suitable for retrieval and execution of instructions stored in machine-readable storage medium 520, or combinations thereof. For example, the processor 510 may include multiple cores on a chip, include multiple cores across multiple chips, multiple cores across multiple devices (e.g., if the computing device 500 includes multiple node devices), or combinations thereof. Processor 510 may fetch, decode, and execute instructions 522, 524, 526 to implement method 400. As an alternative or in addition to retrieving and executing instructions, processor 510 may include at least one integrated circuit (IC), other control logic, other electronic circuits, or combinations thereof that include a number of electronic components for performing the functionality of instructions 522, 524, 526.

Machine-readable storage medium 520 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium 520 may be encoded with a series of executable instructions for performing the approaches described herein.

At 402, the computing device 500 can execute traffic analysis instructions 522 to analyze traffic between a web application scanner and an AUT to determine a set of terms for a security test. As noted above, the traffic can be loaded from a database of a previous scan of the AUT or the traffic can be analyzed inline. One or more pages of the AUT can be tokenized to generate tokens. The tokens can be determined using one or more delimiters. Further, content tokens can be separated form markup tokens using a filter. This can be configured based on what particular markup used by the AUT looks like. As such, the set of terms can exclude content tokens. The set of terms can be determined based on the content tokens (e.g., can include the content tokens).

At 404, filtering instructions 524 can be executed to cause the terms to be filtered with words in a dictionary to generate a filtered set of terms in the set that are not in the dictionary. In one example, the filtered set can be determined based on a comparison of the terms of the set and words in the dictionary. In some examples, the words in the dictionary can be common words. The comparison can be based on hashes of the terms of the set and hashes of the dictionary. The hashes of the dictionary can be pre-computed to allow for less processing and/or faster processing. The filtered set can be based, at least in part, on the comparison (e.g., the filtered set does not include terms that match the words in the dictionary according to one or more comparisons).

At 406, the filtered set can be used as input to the AUT for the security test. In one example, a target list based on the filtered set and the dictionary and/or another dictionary can be generated. The processor 510 can execute the security test instructions 526 to use the filtered set for input to the AUT.

The target list can include tokens. The tokens can be generated based on at least one of the terms of the filtered set. In some examples, the tokens can include a word from the filtered set with additional information (e.g., additional numerals, words from the other dictionary, and/or characters added) and/or processing (e.g., 1337 speak filter processing, etc.). In some examples, additional words from the other dictionary can include words that are used commonly as usernames and/or passwords (e.g., used as a default password in one or more manufacturer's systems, used as a common password/username (e.g., god, username, password, etc.), etc.). Words that are known to be used as usernames and/or passwords can be considered words known to be used as authentication for one or more devices. The target list can be sorted (e.g., such that one or more tokens generated from the filtered list are prioritized in use).

The tokens can be used as the input to the AUT. In one example, the tokens can be used for fuzzing in general. In another example, the tokens can be used as input to at least one of authentication and authorization. Moreover, the token can be used as the input of at least one of a user identifier field and a password field of the AUT.

Figure 6:
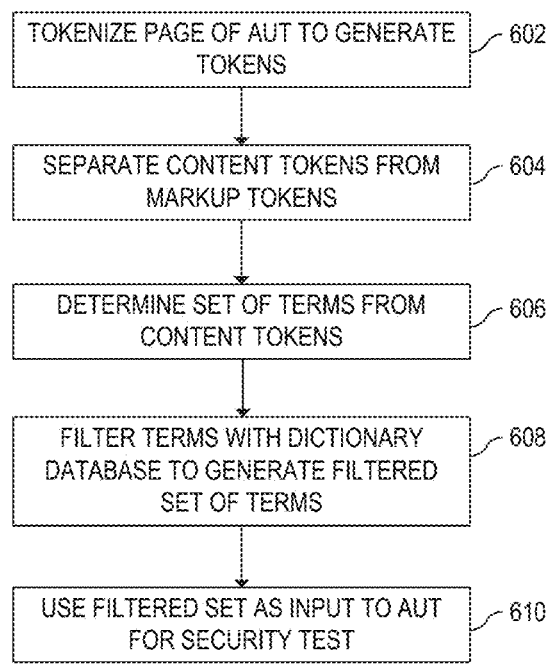
FIG. 6 is a flowchart of a method for using a filtered set of terms for a security test of an application under test, according to one example.

FIG. 6 is a flowchart of a method for using a filtered set of terms for a security test of an application under test, according to one example. Although execution of method 600 is described below with reference to device 100, other suitable components for execution of method 600 can be utilized (e.g., computing device 500). Additionally, the components for executing the method 600 may be spread among multiple devices. Method 600 may be implemented in the form of executable instructions stored on a machine-readable storage medium, such as storage medium 520, and/or in the form of electronic circuitry.

At 602, an analysis engine 110 can tokenize a page of an AUT to generate tokens. The page can be considered web traffic from the AUT and may be accessed by a web application scanner. The traffic can be in the form of a file or can be performed inline with a web application scan. Content tokens can be separated from markup tokens (604). The separation of the tokens can be based on a configuration and/or particular markup used by the AUT. In some examples, the tokens can be generated using delimiters. Then, the tokens can be filtered based on what the markup associated with the AUT looks like. Rules can be set to look for the characteristics of particular markup and a filter can be used to separate the markup from the content tokens. In some examples, content tokens can be considered tokens that do not include the markup. In other examples, the filtering of the markup can occur during tokenization of the page.

At 606, the analysis engine 110 can determine a set of terms from the content tokens. The terms can be the words included in the content tokens. Repeat tokens need not be added to the set of terms. In some examples, the number of times a term was found can be counted for processing. This can be used in prioritization of terms to use. When a unique term is used regularly, it can signify relevance to the AUT and/or developers/users of the AUT.

At 608, the filter engine 112 can filter the terms with a dictionary database of common words to generate a filtered set of the terms in the content tokens, but not in the dictionary database of common words. As noted, the term common words can be based on one or more criteria. As noted above, the filtering can be accomplished using hashes. For example, hashes can be generated for the terms of the set. The dictionary database can have hashes computed as well or precomputed. The hashes of the terms in the set can be compared to the hashes of the dictionary database to generate the filtered set of terms. The filtered set can include terms that are included in the content tokens, but not included in the dictionary database. These terms can be considered unique as compared to the dictionary database. This provides some relevance such that the terms are more likely to be significant to users of the AUT (e.g., an administrator, developer, etc.). These users may have left a back door or test credential that may be exploited.

At 610, the security test engine 114 can use the filtered set as input to the AUT for a security test. The input can be for authentication and/or authorization control. In some examples, authentication is the act of confirming the truth of something (e.g., confirming that a user is associated with a username using a username and password). In other examples, authorization is a check on whether a particular entity (e.g., user) should be provided access to part of the AUT. This can also be based on a credential associated with a username/password combination and/or something else (e.g., a password or key to something, the answer to a question entered in a field, etc.). For the security test, a token can be generated to be used in a field as input. The token can include, for example, one of the filtered terms and/or a modification of the filtered term. For example, a term found, HTTPEE, may be converted to HTTP33 using a modification algorithm that is based on the original term. Moreover, the token can include additional information based on an algorithm (e.g., the term HTTPEE can be turned into a token GODHTTPEE by adding a commonly used password, god, to the term HTTPEE). In some examples, the token(s) can be used in at least one of an identifier field (e.g., a user identifier field) and a password field. As noted above, the tokens can be prioritized for use in the security test (e.g., as part of a brute force attack).

With the approaches described herein, a security test can perform automated functionality to find vulnerabilities. The wordlist created using the approaches described herein can provide context for the security test to help generate a more secure application that is being tested. The vulnerability report generated by the security test can also be used to make the AUT more secure when implemented in a real world environment.

What is claimed is:

1. A non-transitory machine-readable storage medium storing instructions that, when executed by at least one processor of a device, cause the device to:
    tokenize a page of an application under test (AUT) to generate tokens;
    distinguish between content tokens and markup tokens;
    determine a set of terms from the content tokens for a security test;
    generate respective hashes of the set of terms;
    filter the set of terms based on a comparison of the respective hashes of the set of terms with hashes of terms in a dictionary to generate a filtered set of terms, the filtered set of terms including terms that are not in the dictionary; and
    use the filtered set of terms to generate input to the AUT for the security test.

2. The non-transitory machine-readable storage medium of claim 1, further comprising instructions that, when executed by the at least one processor, cause the device to:
    generate a further token based on at least one term of the filtered set of terms; and
    use the further token as an input to an authentication input field or an authorization input field of the AUT during the security test.

3. The non-transitory machine-readable storage medium of claim 2, wherein the generating of the further token comprises modifying the at least one term to produce the further token.

4. The non-transitory machine-readable storage medium of claim 1, further comprising instructions that, when executed by the at least one processor, cause the device to:
    generate a further token based on at least one term of the filtered set of terms; and
    use the further token as an input to a user identifier field or a password field of the AUT during the security test.

5. The non-transitory machine-readable storage medium of claim 1, further comprising instructions that, when executed by the at least one processor, cause the device to:
    generate a target list based on the filtered set of terms and the dictionary; and
    sort the target list, wherein tokens of the target list are used as the input to the AUT.

6. The non-transitory machine-readable storage medium of claim 5, wherein the target list further includes a set of words to be used as authentication for one or more devices.

7. The non-transitory machine-readable storage medium of claim 1, further comprising instructions that, when executed by the at least one processor, cause the device to:
    load traffic comprising the page from a database of a previous scan of the AUT.

8. The non-transitory machine-readable storage medium of claim 1, wherein the terms of the filtered set of terms are unique with respect to the terms in the dictionary.

9. The non-transitory machine-readable storage medium of claim 1, wherein a term in the dictionary is excluded from the filtered set of terms based on the comparison.

10. A computing device comprising:
    a processor; and
    a non-transitory storage medium storing instructions executable on the processor to:
        tokenize a page of an application under test (AUT) to generate tokens;
        distinguish between content tokens and markup tokens;
        determine a set of terms from the content tokens for a security test;
        generate respective hashes of the set of terms;
        filter the set of terms based on a comparison of the respective hashes of the set of terms with hashes of terms in a dictionary to generate a filtered set of terms, the filtered set of terms excluding the terms in the dictionary;
        use the filtered set of terms as input to the AUT during the security test.

11. The computing device of claim 10, wherein the instructions are executable on the processor to filter out terms from the set of terms that are not unique compared to the dictionary.

12. The computing device of claim 10, wherein the instructions are executable on the processor further to:
    generate a further token based on at least one term of the filtered set of terms; and
    use the further token as an input to a user identifier field or a password field of the AUT during the security test.

13. The computing device of claim 10, wherein the instructions are executable on the processor further to:
    generate a further token based on at least one term of the filtered set of terms; and
    use the further token as an input to an authentication input field or an authorization input field of the AUT during the security test.

14. The computing device of claim 13, wherein the generating of the further token comprises modifying the at least one term to produce the further token.

15. A method performed by a system comprising a hardware processor, comprising:
    tokenizing a page of an application under test (AUT) to generate tokens;
    distinguishing between content tokens and markup tokens;
    determining a set of terms from the content tokens;
    generating respective hashes of the set of terms;
    filtering the set of terms based on a comparison of the respective hashes of the set of terms with hashes of terms in a dictionary database of common words to generate a filtered set of terms, the filtered set of terms including terms that are unique with respect to the terms in the dictionary database of common words; and
    using the filtered set of terms as input to the AUT for a security test against at least one of authentication and authorization controls of the AUT.

16. The method of claim 15, further comprising:
    generating a further token based on at least one term of the filtered set of terms; and
    using the further token as an input to a user identifier field or a password field of the AUT during the security test.

* * * * *